Jan. 25, 1927. 1,615,223
O. F. A. E. GRUMPELT
METHOD OF DISINTEGRATING OR CUTTING TO PIECES OR DEMOLISHING
WRECKED SHIPS OR THE LIKE
Filed April 3, 1925

Inventor
O.F.A.E. Grumpelt.
by Langner, Parry, Card & Langner
Attys.

Patented Jan. 25, 1927.

1,615,223

UNITED STATES PATENT OFFICE.

OSKAR FRITZ AMANDUS EMIL GRUMPELT, OF HAMBURG, GERMANY, ASSIGNOR TO THE FIRM OF ELEKTROTRENNMASCHINEN GESELLSCHAFT MIT BESCHRANKTER HAFTUNG, OF HAMBURG, GERMANY.

METHOD OF DISINTEGRATING OR CUTTING TO PIECES OR DEMOLISHING WRECKED SHIPS OR THE LIKE.

Application filed April 3, 1925, Serial No. 20,524, and in Germany April 7, 1924.

Ship-wrecked vessels or bodies of ships that have become useless for some other reason, even when it is not a question of recovering the iron, must be cut to pieces or disintegrated for facilitating their clearing away. The general aim was to carry out this work with as little cost as possible, however, this task has not been solved satisfactorily up to this day. Originally the breaking up of wrecked ships was carried out by hand. Later on the breaking or cutting up was thought to be better and more conveniently carried out by the aid of autogenous cutting and it was believed that even the costs would be less. However, this very soon was found to be a mistake, the costs of the oxygen proving the method a failure, so that to a great extent one was compelled to fall back on the breaking up by hand.

By trials it has now been proved that by making use of high speed friction disks when constructed to move in two different directions, the cutting up of vessels or the like can be carried out far easier and with less costs, than all heretofore known proposals. Under certain circumstances it may be of advantage to allow oxygen to be fed to the point where the cutting disk operates on the metal, however, on account of the great costs of oxygen the amount fed should be small and such use is not considered of importance. When a fine stream of oxygen is blown towards the cutting place of the frictional saw certainly a better result will be gained over the known autogenous cutting method. But even when no oxygen is used, the cutting effect is by far superior and can be carried out with very much less costs than by the known autogenous cutting method.

Owing to the movability of the cutting friction disk each cut can be carried out in the desired manner without difficulty. Friction cutting disks running with high velocity are known per se, however, a movability in the meaning of the present invention has never been proposed heretofore. When using such cutting friction disks heretofore it was always necessary to feed the pieces to be cut to the cutting implement. According to the present invention however the work piece, that is the body of the vessel, remains at rest and the cutting implement, that is the high speed friction disk itself, carries out its movements across the work piece.

Movable metal saws, it is true, have been used to cut pig iron, however, these saws were only proposed to move in one direction; and moreover they were only used in foundries. But such saws cannot be compared with high-speed-friction-saws since they do not cut on account of the friction nor owing to the high speed of the edge of the disk but they only cut by their teeth. No teeth need be provided on friction cutting saws.

According to the present invention iron structures such as the body of old vessels can be cut up into small pieces that can readily be used in industry for various purposes.

In the drawing a plan is shown for carrying out the present invention.

Figure 2:
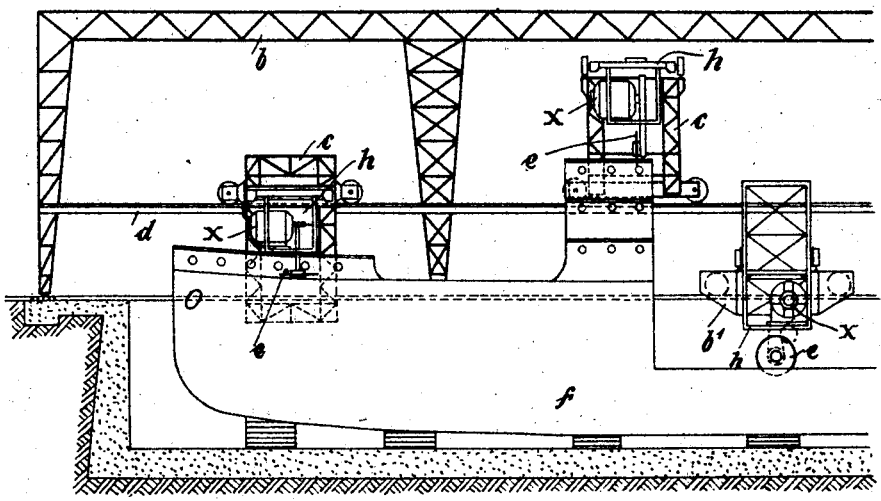
Fig. 2 is a longitudinal section of a dry dock, within which the body of a vessel is to be cut up.
Figure 1:
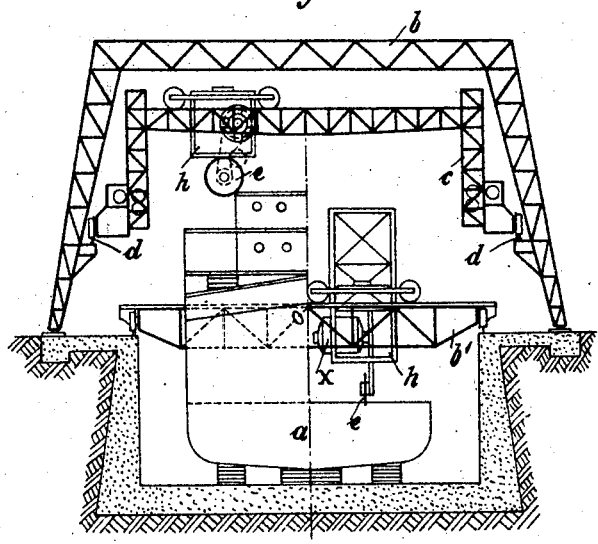
Fig. 1 is a cross section.

In Fig. 1 the front or bow $a$ of a ship to be cut is shown. Above the dry dock rises a travelling crane structure $b$ provided with guide rails $d$, along which a travelling bridge crane $c$ can move, which may be adjustable as to the height. If necessary another or similar travelling crane $b'$ may be arranged to run on lower rails $d'$. On a trolley $h$ running on the bridge crane the high speed friction saw $e$ is mounted, which may be driven by an electromotor $x$. By this device one is in a position to carry out cuts transversely to the body of the vessel, whereby owing to the adjustability of the bridge crane $c$ with regard to the height cuts may be carried out on every part of the vessel.

From the longitudinal section of the drawing it is understood that in a similar manner also cuts on the body of the vessel can be carried out in longitudinal direction. In this figure it is assumed that from the side wall $f$ of the body of the ship one part has been already cut away and that a plurality of travelling bridge cranes $c$ are used, which are adjustably arranged in the guides

*d*. It is evident that on every place in longitudinal direction of the body of the ship cuts can be carried out in a similar manner as has been described with regard to transversal direction. By the means described above it will be understood that the body of the ship in a very short time can be cut to pieces that are well adapted to be used in industry. By adjusting the frictional saw or disk *e* in the required direction it is possible to conveniently carry out horizontal cuts as well as vertical cuts. By making use of swinging cranes it is evident that circular or curved cuts can be carried out.

It is evident that the method can be performed within any kind of structure or building.

I claim:

The method of demolishing an obsolete vessel which consists in maintaining the vessel stationary beneath an overhanging frame on which are mounted a plurality of rotary cutting tools traveling, both for adjustment and for feed, in length, width and height directions relative to the vessel, said tools rotating in three intersecting perpendicular planes, and subjecting the vessel selectively and in selected portions to the cutting action of the said tools.

OSKAR FRITZ AMANDUS EMIL GRUMPELT.